May 27, 1930.   J. HERTZ   1,760,755
COFFEE MILL
Filed Aug. 30, 1928   3 Sheets-Sheet 1

Inventor:-
Jørgen Hertz

May 27, 1930. J. HERTZ 1,760,755
COFFEE MILL
Filed Aug. 30, 1928  3 Sheets-Sheet 2
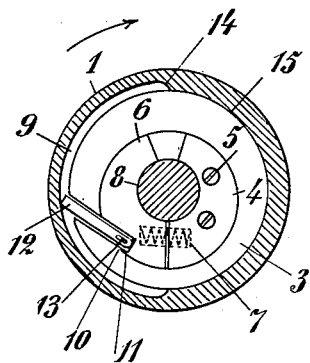
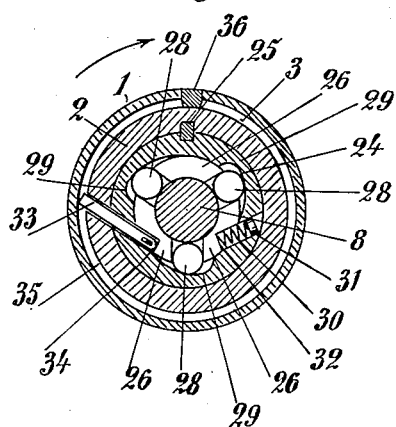
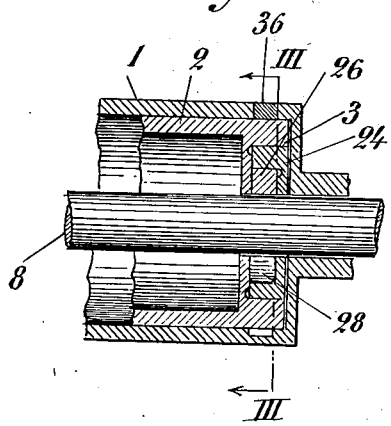
Inventor
Jorgen Hertz.
by
Attys May 27, 1930.  J. HERTZ  1,760,755
COFFEE MILL
Filed Aug. 30, 1928    3 Sheets-Sheet 3
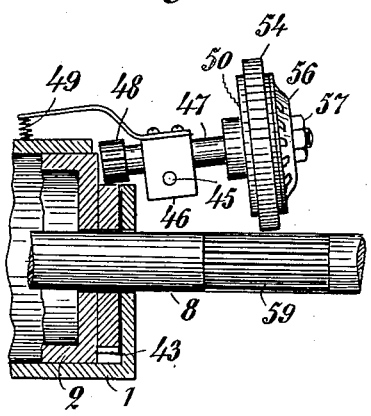
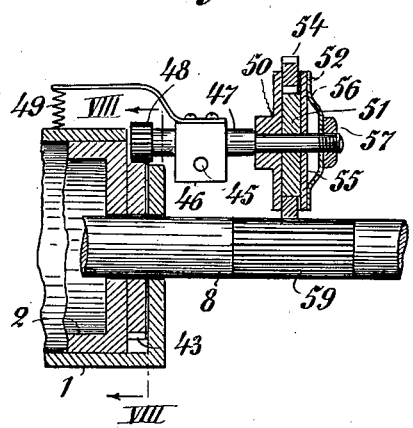
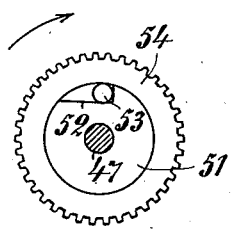
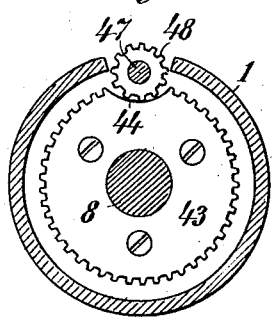
Inventor
Jorgen Hertz Patented May 27, 1930

1,760,755

UNITED STATES PATENT OFFICE

JØRGEN HERTZ, OF COPENHAGEN, DENMARK

COFFEE MILL

Application filed August 30, 1928, Serial No. 303,057, and in Denmark September 7, 1927.

This invention relates to coffee mills of the well known type in which the outer grinding body or one or both of the outer grinding bodies, if two such members are provided, is or are rigidly connected with or made integral with a normally stationary carrier which, however, is released and rotates within the mill casing if the torque acting upon the carrier exceeds a predetermined amount, for instance in the case of a hard foreign matter entering into the space between the inner and outer grinding bodies.

When the carrier has been turned in such a manner it has hitherto been necessary to return the carrier to its normal working positon (the grinding position) by hand whether it has been necessary before to stop the rotation of the mill shaft or the coffee mill has been so constructed as to permit a continuous rotation of this shaft.

The invention has for its object to facilitate the practical use of such coffee mills and is mainly characterized by the provision of a suitable clutch mechanism interposed between the outer grinding body and the mill shaft and adapted to automatically move the outer grinding body back to its normal position.

Thus when the outer grinding body for one reason or the other is released from the mill casing and turned away from its working position the said clutch mechanism which is normally inoperative is engaged and couples the outer grinding body to the mill shaft so that the latter if it still rotates or as soon as it is started again after having been stopped turns the outer grinding body back to its normal position where the clutch mechanism is again disengaged so that the outer grinding body is left in its normal working position. The clutch mechanism may eventually be combined with a suitable gearing so that the returning of the outer grinding body is effected at a speed different from and preferably lower than that of the mill shaft.

For the purpose of this invention clutch mechanism of widely different construction may be used, not such only which cause the outer grinding body to rotate at the same speed as that of the mill shaft but also such clutch mechanism which as indicated above permit these members to rotate at different speeds and which for instance perform the functions of engageable and disengageable gearings. Thus the invention is not restricted to the use of any particular clutch mechanism or gearing but is generally characterized by the feature that the movement of the mill shaft proper is utilized for automatically rotating the outer grinding body back to its normal position.

According to a second feature of the invention the coupling together of the outer grinding body and the shaft may be effected by a suitable mechanism mainly acting as a wedge between the said members so that these are substantially caused to rotate as a unit.

Two such embodiments of the invention and a different third one are shown on the drawings.

In all of these embodiments the invention is by way of example meant to be applied to a coffee mill of the well known type in which the carrier is normally maintained stationary within the mill casing by means of spring-pressed locking studs mounted in the casing and engaging holes in the carrier, which studs are pressed back and release the carrier as soon as the torque acting upon the latter exceeds a predetermined amount. It is to be understood, however, that the particular construction of the coffee mill is of no importance to the arrangement and utility of the invention which may as well be used in coffee mills provided with different means for normally keeping the carrier and the outer grinding body stationary in the mill casing.

On the drawings some few embodiments of the invention are shown.

Fig. 2 is a cross-section and partial end view of the same along the line I—I of Fig. 1.

Figure 1:
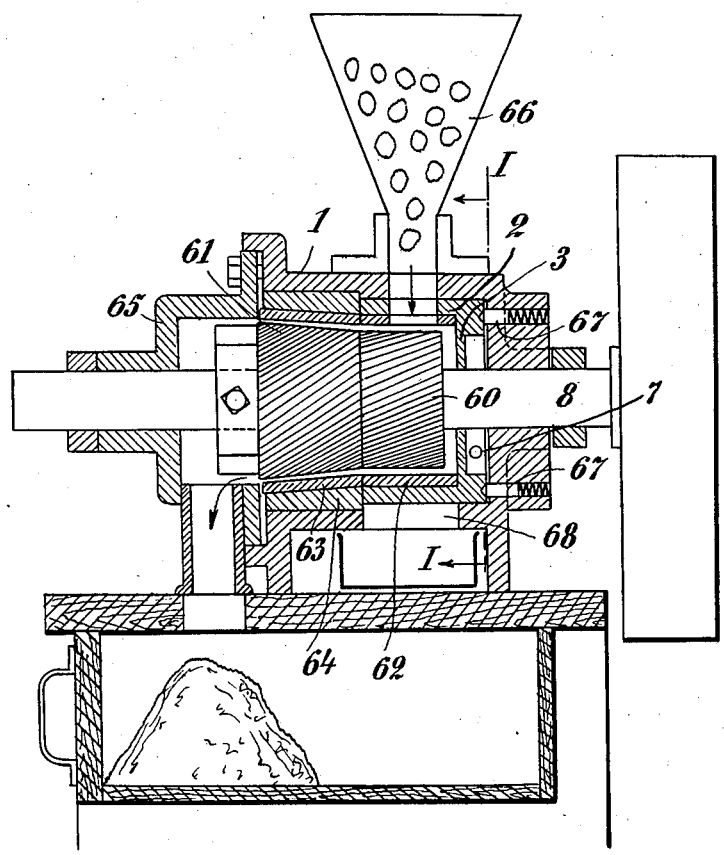
Fig. 1 is a vertical longitudinal section through a complete coffee-mill of known general construction, including an embodiment of the invention.

Figures 3 and 4 show the second embodiment in cross-section along the line III—III in Figure 4 and in longitudinal section respectively, Figure 5 shows the third embodiment of the invention partly in elevation and partly in longitudinal section, the clutch mechanism or gearing being here shown in the inoperative position, Figure 6 depicts the same with the clutch mechanism in engaged position, Figure 7 shows a detail of the same and Figure 8 is a cross-section along the broken line VIII—VIII in Figure 6.

The embodiments shown in Figures 3 and 4 and in Figures 5-8 respectively may be used in a coffee-mill of the kind illustrated in Figure 1.

In the coffee-mill shown in Figure 1 the stationary mill casing is designated by 1. In the bore of the same a cylindrical carrier 2 for an outer grinding body 62 fits which latter coacts with an inner cylindrical grinding body 60 secured on the rotating mill shaft 8. The latter also carries an inner conical grinding body 61 coacting with an outer conical grinding body 63 rigidly clamped in position into a stationary sleeve 64 by means of an end cover 65. From the supply hopper 66 the coffee beans are fed through aligned openings in the carrier 2 and the outer grinding body 62 into the space between the stationary and the rotating grinding bodies. The carrier 2 namely normally is kept stationary by means of spring pressed locking studs 67 mounted in bores in the mill casing and engaging depressions in the end wall 3 of the carrier 2. If the torque transmitted to the outer grinding body 62 and thereby to the carrier 2 exceeds a predetermined amount, for instance if a nail or other hard foreign matter is carried together with the coffee beans into the small space between the grinding bodies, then the carrier is released and turns within the mill casing to thereby prevent damage of the grinding teeth of the grinding bodies. The hard foreign matter may be removed through an opening 68 provided in the lower part of the mill casing, but this forms no part of the present invention.

The parts thus far described are of known kind.

According to the invention, in the embodiment shown in Figures 1 and 2 in the outer end wall 3 of the carrier there is found a low eccentrical bore wherein a jaw 4 rigidly secured by means of screws 5, and a movable jaw 6 fit. A spring 7 tends to press these jaws together around the shaft and thus to couple the latter and the carrier 2 together by friction. In the inner cylindrical surface of the mill casing 1 there is provided a groove or recess 9 extending a suitable part of the circumference. The movable jaw 6 has a cavity 10 against the bottom 11 of which a pin 12 engages, the latter being besides connected with the jaw 6 by means of a small pin 13 loosely engaging a hole in the pin 12. The pin 12 is mounted in a groove in the carrier 2 so that its longitudinal direction is that of a tangent to the jaw 6, and the length of the pin 12 is so proportioned that the outer end of the pin engages the circumferential groove 9 when the spring 7 forces the heavy ends of the jaws 4 and 6 away from each other.

When the carrier 2 is rotated so that the pin 12 is about leaving the groove 9 the end of the pin is pressed against the inclined face 14 adjacent the inner cylindrical surface 15 of the mill casing, whereby the pin 12 is pressed back into the carrier so that the jaw 6 is turned in a counter clockwise direction, Figure 2, against the action of the spring 7. Thus the grasp of the jaws around the shaft 8 ceases so that the shaft is thereby released from the carrier.

The apparatus operates in the following manner:

In its normal position the carrier 2 is maintained stationary in a manner known per se by means of the spring pressed studs or the like named above, and the end of the pin 12 abuts against the inner face 15 of the mill casing, so that the two jaws 4 and 6 do not engage the shaft 8.

On the other hand if a hard foreign member together with the coffee beans comes into the mill and the locking studs or the like are released so that the carrier 2 is also rotated the outer end of the pin 12 at a suitable point during the rotation will enter into the groove 9 thereby allowing the spring 7 to press the jaws 4 and 6 together around the shaft 8 whereby the carrier 2 is coupled to the shaft and rotated with the latter. As long as the said foreign matter keeps the outer grinding body coupled to the inner grinding body the said coupling together of the carrier and the shaft by means of the jaws is of no substantial importance, but as soon as the foreign matter has been removed the coupling of the carrier and the shaft performs a useful function.

Before explaining this it is to be noted that the foreign matter may be removed either by hand after the rotation of the shaft has been stopped or automatically, for instance by being thrown out through a shutter or flap which rotates with the outer grinding body and the carrier and is opened due to centrifugal force when reaching an opening in the bottom of the mill casing. Such a device forms no part of the present invention and is described in my British Patent No. 280,452. Now whether the foreign matter is removed in one way or the other it will be understood that as soon as the shaft is rotated after the removal of the foreign matter the engaged clutch mechanism 4, 6 will cause the carrier to rotate until the pin 12 is pressed against the face 14, whereby the pin 12 will disengage the jaws, so that the carrier is left stationary in the normal position (wherein it is maintained by the locking studs or the like referred to above) and the mill then again works in a normal way.

In order to make sure that the jaw 6 leaves hold of the shaft 8 the said jaw may be guided by any suitable means in such a manner that it is compelled to turn concentrically with the circumference of the eccentric bore in which it is accommodated.

The shaft 8 may be provided with a sleeve serving to co-act with the jaws and formed of a material highly resistant against wear or of a material having a high coefficient of friction.

In the embodiment shown in Figures 3 and 4 the end wall 3 of the carrier 2 is provided with a concentric bore receiving a cupshaped member 24 which by means of a key 25 or in another suitable way is rigidly secured to the carrier 2.

The cup 24 accommodates in its concentrical cavity three segmental members 26 which can slide within the cup. They may be guided in such a manner that they do not touch the shaft 8. Between the plane end faces of the segmental members rollers (or balls) 28 are positioned which must follow the turning movement of the members 26 but are capable of sliding in radial direction relative to them. In the inner side of the flange or rim of the cup 24 there are formed three eccentrical cavities or cut outs 29, each of which receives a roller 28. These rollers 28 and cut outs 29 are so proportioned that each roller when lying in the end of the cut out having the largest diameter is removed a certain distance from the shaft, while the roller when carried to the opposite end of the cut out is moved inwards and thus pressed against the shaft.

In an opening in the cup 24 a spring 30 is placed, one end of which engages a fixed plug 31 in the cup 24 while the other end of the spring abuts against a radial shoulder 32 formed on one of the members 26. This spring is mainly placed tangentially of the corresponding member 26. The spring tends to turn all of the segmental members and the rollers in such a direction that the latter are displaced to those ends of the respective cut outs 29 having the smallest diameter, so that the three rollers are pressed against the shaft 8 and couple the latter to the cup 24 and thereby to the carrier 2 in a manner similar to the operation of the well known type of back pedalling brakes for bicycles.

A pin 33 abuts against a shoulder 34 formed in one of the jaws 26 and is mounted tangentially of the jaw in a groove in the cup 24 and the carrier 2. One end of the pin projects into an annular groove 35 in the mill casing 1, and the pin 33 furthermore is adapted to function in a similar way as the pin 12 in Figure 2. It will be noted that the groove 35 here extends mainly around the entire inner circumference of the mill casing and is interrupted only by a lug or projection 36 secured in the wall of the mill casing and provided with sloping faces.

In order to keep the rollers 28 away from the shaft when they shall not be pressed against the same a small bent flat spring (not shown) may be arranged at one end or both ends of each of the jaws 26, said springs being adapted to engage the rollers at their inner side and to press them outwards from the shaft.

In the normal working position of the carrier the outer end of the pin 33 engages the inner side of the lug 36, the pin 33 thus having drvien all of the three rollers 28 into those ends of their corresponding cut outs which are farthest away from the center of the shaft, so that the rollers do not touch the shaft.

If a hard foreign body comes into the mill and the locking studs or the like are released in the known manner so that the carrier 2 by said foreign body is coupled to the shaft 8 and rotates with the latter the pin 33 will immediately enter the groove 35. The carrier then is coupled by means of the rollers 28 to the shaft 8 and after the removal of the foreign body will be carried along with the shaft to the normal position, where the carrier is again released and remains stationary.

It will be understood that due to the small lug 36 the clutch mechanism in this embodiment will couple the carrier to the shaft practically in all positions of the carrier other than its normal working position. A similar effect may of course be obtained by the embodiment shown in Figures 1 and 2 by enlarging the groove 9 to extend around almost the entire periphery of the mill casing.

In the construction shown in Figures 3 and 4 the number of the jaws and the rollers may be varied, and furthermore the jaws may be replaced by an integral ring provided with radial grooves for receiving the rollers or the balls.

In the embodiment of the invention shown in Figures 5–8 there is secured on the end wall of the normally stationary carrier 2 a gear wheel 43 having a recess 44 at its circumference as shown in Figure 8. 45 designates a shaft mounted in stationary bearings (not shown) and carrying a holder 46 which may swing on said shaft. A second shaft 47 is rotatably mounted in the holder 46 and carries at one end a pinion 48 adapted to engage the gear wheel 43. A helical spring 49 tends to press the pinion 48 towards the gear wheel 43, but normally the teeth do not engage each other since the pinion 48 is accommodated in the recess 44. On the opposite end of the shaft 47 there is secured a hub 50, at one side of which a circular disc 51 is mounted to rotate around the shaft. This disc 51 is provided at its circumference with a notch 52 receiving a ball or roller 53 as shown in Figure 7. Surrounding the disc 51 is a toothed ring 54 which may rotate on the disc 51. Due to the ball or roller 53 the rotation can take place in one direction only, as the said ball acts as a one way clutch.

Thus if it is tried to rotate the toothed ring in a direction opposite to that indicated by the arrow in Figure 7 the ball or roller 53 will be clamped between the toothed ring and the disc 51, so that the toothed ring carries the disc with it. In other words mutual rotation of the parts 54 and 51 can take place in one direction only. A disc 55 is pressed against the disc 51 by an arched plate spring 56 maintained in position by a nut 57 screwed onto the end of the shaft 47. The thickness of the toothed ring 54 is a little smaller than that of the disc 51, so that the disc 55 is pressed against the disc 51, but not against the toothed ring.

The shaft 8 is provided with teeth forming a gear wheel 59 adapted to engage with the toothed ring 54.

Figure 5 shows the normal position of the several parts. The carrier 2 is locked in a known manner by a locking mechanism, and the spring 49 keeps the gear wheels 54 and 59 out of engagement with each other and at the same time maintains the pinion 48 in the recess 44. Thus the shaft 47 and all of the parts carried thereby remain stationary while the mill is working normally.

Figure 6 shows a position corresponding to a situation where the carrier 2 has been released from the mill casing by a hard foreign body entering the mill. The carrier then will rotate whereby the pinion 48 rolls out of the recess 44, and the shaft 47 together with the parts carried thereby swings on the shaft 45 so that the toothed ring 54 is caused to engage the teeth 59, while the pinion 48 simultaneously engages the gear wheel 43.

As long as the foreign body keeps the carrier 2 coupled to the shaft 8 the carrier rotates mainly with the same speed as that of the shaft. The gear wheel 43 then will drive the pinion 48 at a higher speed, whereas the gear wheel 54 will rotate more slowly than the shaft 48 which is permitted by the one way clutch 52, 53. As soon as the foreign body has been removed (whether this is effected automatically or in another way) the toothed ring 54 by means of the ball 53 will be coupled to the disc 51 and thereby to the shaft 47, so that the millshaft 8 now by means of the gearing 59, 54, 48, 43 may drive the carrier 2 until the latter is carried back to the working position, in which the pinion 48 again enters the recess 44 and the mechanism just described does not operate longer. The carrier 2 will then again be maintained stationary in the mill casing by means of the locking studs or the like referred to above.

Having thus fully described my invention I claim as new and desire to secure by Letters Patent:

1. In a coffee mill, in combination: a mill-casing, an outer grinding body adapted to be maintained stationary within said mill-casing under normal running conditions, a driven mill-shaft adapted to carry an inner grinding body for co-operation with said outer grinding body, said outer grinding body being arranged to rotate within said mill-casing if the torque transmitted to the same exceeds a predetermined amount, and means which when the outer grinding body has been so rotated through a predetermined angle establish a driving connection between said outer grinding body and said mill-shaft.

2. In a coffee mill, in combination: a mill-casing, an outer grinding body adapted to be maintained stationary within said mill-casing against a predetermined torque transmitted to the same, a driven mill-shaft adapted to carry an inner grinding body for co-operation with said outer grinding body, and means for automatically moving the said outer grinding body to its normal working position when it has been removed from the same due to the transmitting of an excessive torque thereto.

3. In a coffee mill, in combination: a mill-casing, an outer grinding body rotatably mounted within said mill-casing and adapted to be maintained stationary under normal running conditions, a driven mill-shaft adapted to carry an inner grinding body for co-operation with said outer grinding body, and a normally inoperative clutch mechanism which when the outer grinding body is released and turns within the mill-casing couples the outer grinding body to said mill shaft.

4. The device of claim 3, in which said clutch mechanism comprises movable members adapted to couple said outer grinding body to said mill-shaft by wedge-action.

5. In a coffee mill, in combination: a mill-casing, a carrier rotatably mounted within said mill-casing, said carrier being adapted to receive an outer grinding body and to be maintained stationary under normal running conditions, a driven mill-shaft adapted to receive an inner grinding body, spaced clutch elements adapted to co-act with said mill-shaft and with eccentric cam faces associated with said carrier, and means including said eccentric cam faces for pressing said clutch elements against the mill-shaft to thereby couple the latter to the carrier upon a predetermined angular movement of the same away from its normal working position and for releasing said mill-shaft from the carrier when the latter again reaches its normal working position.

6. The device of claim 5, in which said clutch elements are kept spaced by segmental members mounted to turn concentric with said carrier and mill-shaft.

7. The device of claim 5, in which said means include a spring and a movable member both acting upon the said clutch elements, said pin also co-acting with a stationary part of the mill-casing.

In testimony whereof I have affixed my signature.

JØRGEN HERTZ.